United States Patent
McDaniel et al.

(10) Patent No.: US 9,758,294 B2
(45) Date of Patent: Sep. 12, 2017

(54) COMPONENTS FOR AEROSOL DISPENSER AND AEROSOL DISPENSER MADE THEREWITH

(71) Applicants: John Andrew McDaniel, Middletown, OH (US); Douglas Bruce Zeik, Liberty, OH (US); Norman Scott Broyles, Hamilton, OH (US); Robert Earl Magness, Mason, OH (US); Dimitris Ioannis Collias, Mason, OH (US); Scott Edward Smith, Cincinnati, OH (US); Matthew Aaron Neumann, Montgomery, OH (US)

(72) Inventors: John Andrew McDaniel, Middletown, OH (US); Douglas Bruce Zeik, Liberty, OH (US); Norman Scott Broyles, Hamilton, OH (US); Robert Earl Magness, Mason, OH (US); Dimitris Ioannis Collias, Mason, OH (US); Scott Edward Smith, Cincinnati, OH (US); Matthew Aaron Neumann, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 379 days.

(21) Appl. No.: 13/749,809

(22) Filed: Jan. 25, 2013

(65) Prior Publication Data

US 2014/0209633 A1 Jul. 31, 2014

(51) Int. Cl.
*B65D 35/28* (2006.01)
*B65D 83/38* (2006.01)
(Continued)

(52) U.S. Cl.
CPC .............. *B65D 83/38* (2013.01); *B29B 11/14* (2013.01); *B29C 49/0073* (2013.01);
(Continued)

(58) Field of Classification Search
CPC .. B65D 83/62; B65D 83/0055; B65D 77/065; B65D 83/38; B65D 83/752; B65D 83/48;
(Continued)

(56) References Cited

U.S. PATENT DOCUMENTS 4,151,250 A 4/1979 Barry et al.
4,261,473 A 4/1981 Yamada et al.
(Continued)

FOREIGN PATENT DOCUMENTS

CA 2614342 A1 10/2003
JP H02 106317 A 4/1990
(Continued)

OTHER PUBLICATIONS

PCT Search Report dated May 20, 2014.

*Primary Examiner* — Frederick C Nicolas
(74) *Attorney, Agent, or Firm* — Larry L. Huston; Steven W. Miller

(57) ABSTRACT

A pressurized container usable for a pressurizable contain, such as an aerosol dispenser, an aerosol dispenser made therewith and preform therefor. The preform/container/dispenser has a neck at the top. The neck has upper and lower portions. The lower portion transitions into a shoulder, which flares outwardly. The shoulder, in turn, transitions into a sidewall. The lower neck portion/shoulder and/or upper part of the sidewall are cystallized. The invention also comprises a preform for making such a pressurizable container and an aerosol dispenser made therewith.

10 Claims, 13 Drawing Sheets

(51) Int. Cl.
    *B29B 11/14*         (2006.01)
    *B29C 49/00*         (2006.01)
    *B65D 83/14*           (2006.01)
    *B65D 77/06*           (2006.01)
    *B65D 83/62*           (2006.01)
    *B65D 83/00*           (2006.01)
    *B65D 1/02*             (2006.01)
    *B65D 83/20*           (2006.01)
    *B65D 83/48*           (2006.01)
    *B29C 49/06*           (2006.01)

(52) U.S. Cl.
    CPC .............. *B29B 2911/1442* (2013.01); *B29B 2911/1446* (2013.01); *B29B 2911/1492* (2013.01); *B29B 2911/14326* (2013.01); *B29B 2911/14333* (2013.01); *B29B 2911/14413* (2013.01); *B29B 2911/14913* (2013.01); *B29B 2911/14926* (2013.01); *B29C 49/06* (2013.01); *B65D 1/02* (2013.01); *B65D 1/023* (2013.01); *B65D 1/0223* (2013.01); *B65D 1/0246* (2013.01); *B65D 77/065* (2013.01); *B65D 83/0055* (2013.01); *B65D 83/20* (2013.01); *B65D 83/48* (2013.01); *B65D 83/62* (2013.01); *B65D 83/752* (2013.01); *Y10T 428/13* (2015.01)

(58) Field of Classification Search
    CPC ........ B65D 83/20; B65D 1/02; B65D 1/0246; B65D 1/023; B65D 1/0223; B29B 11/14; B29B 2911/14326; B29B 2911/14333; B29B 2911/14413; B29B 2911/1442; B29B 2911/1446; B29B 2911/14913; B29B 2911/1492; B29B 2911/14926; B29C 49/0073; B29C 49/106; B29C 49/06; Y10T 428/13
    USPC ..... 222/95, 105, 402.1, 394, 94, 92; 215/45, 215/44, 43, 40, 41, 12.2, 12.1; 428/34.1, 428/35.7; 264/531, 533, 534, 907, 908; 220/586, 582, 62.22, 62.15
    See application file for complete search history.

(56) References Cited

U.S. PATENT DOCUMENTS

| | | |
|---|---|---|
| 4,264,558 A | 4/1981 | Jacobsen |
| 4,385,089 A | 5/1983 | Bonnebat et al. |
| 4,476,170 A | 10/1984 | Jabarin |
| 4,512,948 A | 4/1985 | Jabarin |
| 4,522,779 A | 6/1985 | Jabarin |
| 4,589,559 A | 5/1986 | Hayashi et al. |
| 4,755,404 A | 7/1988 | Collette |
| 4,839,127 A | 6/1989 | Ajmera et al. |
| 4,871,507 A | 10/1989 | Ajmera |
| 4,883,631 A | 11/1989 | Ajmera |
| 4,928,835 A | 5/1990 | Collette et al. |
| 5,027,985 A * | 7/1991 | Abplanalp ............... 222/402.1 |
| 5,152,411 A | 10/1992 | Pope et al. |
| 5,199,615 A * | 4/1993 | Downing et al. .......... 222/397 |
| 5,261,545 A | 11/1993 | Ota et al. |
| 5,320,255 A * | 6/1994 | Stoffel et al. ............. 222/212 |
| 5,419,866 A | 5/1995 | Valyi |
| 5,520,877 A | 5/1996 | Collette et al. |
| 5,735,420 A | 4/1998 | Nakamaki et al. |
| 5,759,656 A | 6/1998 | Collette et al. |
| 5,829,614 A | 11/1998 | Collette et al. |
| 5,908,128 A | 6/1999 | Krishnakumar et al. |
| 5,918,779 A * | 7/1999 | Ventura ..................... 222/402.1 |
| 6,019,252 A | 2/2000 | Benecke et al. |
| 6,168,740 B1 | 1/2001 | Koch et al. |
| 6,217,818 B1 * | 4/2001 | Collette et al. ............ 264/513 |
| 6,372,318 B1 | 4/2002 | Collette et al. |
| 6,497,569 B2 | 12/2002 | Koch et al. |
| 6,514,451 B1 | 2/2003 | Boyd et al. |
| 6,585,124 B2 | 7/2003 | Boyd et al. |
| 6,926,859 B2 | 8/2005 | Collette et al. |
| 7,028,866 B2 | 4/2006 | Kunesh et al. |
| 7,303,087 B2 | 12/2007 | Flashinski et al. |
| 7,721,920 B2 * | 5/2010 | Ruiz De Gopegui et al. ................... 222/402.13 |
| 8,960,503 B2 * | 2/2015 | Soliman ..................... 222/402.1 |
| 2002/0148800 A1 | 10/2002 | Ozawa et al. |
| 2003/0186006 A1 * | 10/2003 | Schmidt et al. ........... 428/35.7 |
| 2004/0149781 A1 * | 8/2004 | Kunesh et al. ............ 222/402.1 |
| 2005/0127022 A1 | 6/2005 | Flashinski et al. |
| 2007/0245538 A1 | 10/2007 | Salameh |
| 2007/0278253 A1 | 12/2007 | Ruiz De Gopegui et al. |
| 2008/0003387 A1 | 1/2008 | Altonen et al. |
| 2010/0200531 A1 * | 8/2010 | Komiya et al. ............ 215/40 |
| 2011/0017701 A1 * | 1/2011 | Soliman .................... 215/381 |
| 2011/0174765 A1 | 7/2011 | Patel et al. |
| 2013/0037580 A1 | 2/2013 | Armstrong et al. |

FOREIGN PATENT DOCUMENTS

| | | |
|---|---|---|
| JP | A-H02-214555 | 8/1990 |
| JP | A-H07-156976 | 6/1995 |
| JP | A-H07-300168 | 11/1995 |
| JP | H11 235751 A | 8/1999 |
| JP | A-2004-1481 | 1/2001 |
| WO | WO 98/52729 A1 | 11/1998 |

* cited by examiner

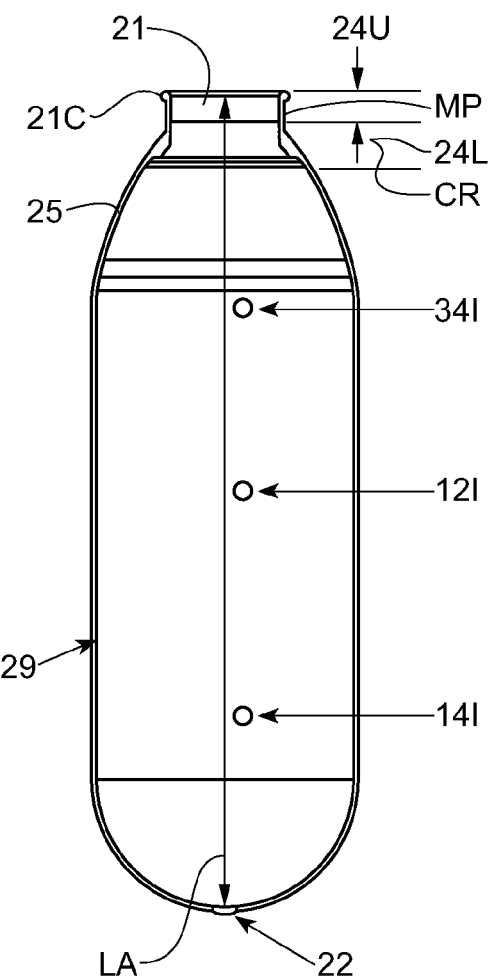
Fig. 6A
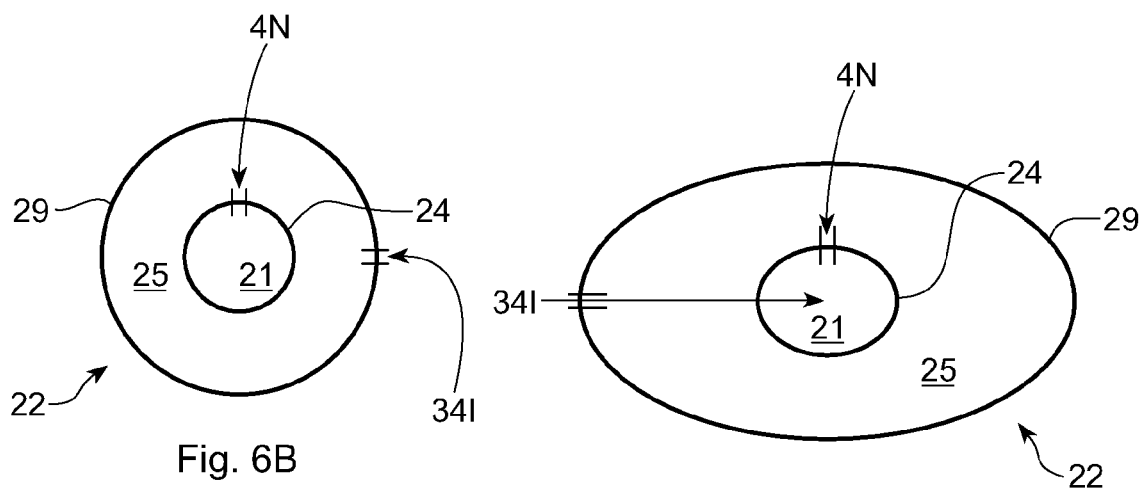
Fig. 6B
Fig. 6C

COMPONENTS FOR AEROSOL DISPENSER AND AEROSOL DISPENSER MADE THEREWITH

FIELD OF THE INVENTION

The present invention relates to aerosol dispensers, components therefor and the manufacture of such components and aerosol dispensers.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Thus, plastic outer containers may be utilized for aerosol dispensers.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804. Sidewalls defining the shape of the outer container extend upwardly from the bottom to an open top.

The open top defines a neck having an opening for receiving additional components of the aerosol dispenser. The industry has generally settled upon a neck diameter of 2.54 cm, for standardization of components among various manufacturers, although smaller diameters, such as 20 mm, are also used. Various neck shapes are shown in US 2007/02782531 A1; U.S. Pat. Nos. 7,303,087; 7,028,866; and commonly assigned U.S. Pat. No. 6,019,252.

Typically a valve cup is inserted into the neck. The valve cup is sealed against the neck to prevent the escape of the propellant and loss of pressurization. The valve cup holds the valve components which are movable in relationship to the balance of the aerosol dispenser.

Aerosol dispensers, having a valve cup and movable valve components, may comprise different embodiments for holding, storing, and dispensing product used by the consumer. In one embodiment, the product and propellant are intermixed. When the user actuates the valve, the product and propellant are dispensed together. This embodiment may utilize a dip tube. The dip tube takes the product and propellant mixture from the bottom of the outer container. By dispensing from the bottom of the outer container, the user is more likely to achieve dispensing of the product/propellant mixture and not dispense pure propellant from the headspace. This embodiment may be used, for example, to dispense shaving foam products.

In another embodiment, a collapsible, flexible bag may be sealed to the opening on the underside of the valve cup or may be placed between the valve cup and the container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. Gage pressure from the propellant disposed between the bag and the outer container causes pressurization of the product, forcing the product to flow into ambient pressure. This embodiment is commonly called a bag on valve or bag in can and may be used, for example, in dispensing shaving gel products. In either embodiment, flow to the ambient may comprise droplets, as used for air fresheners or may comprise deposition on a target surface, as may occur with cleansers.

Both embodiments may utilize hydrocarbon propellant and/or inert gas propellant, such as Tetrafluoroprop-1-ene commercially available from Honeywell Company of Morristown, N.J. or nitrogen. If a hydrocarbon propellant is selected, the manufacturing process often becomes more complex and costly due to safety concerns, environmental regulations and other industry regulations.

Plastic outer containers have the advantages of cost and recyclability. But in order to accommodate the desired pressure during shipment, storage and use, the walls of the outer container must be able to withstand and maintain the gage pressure after manufacture through a variety of temperatures, orientations, and handling by the user. The walls of the container must therefore be thick enough to minimize/prevent leakage/permeation of the contents under pressure or cracking due to stress. This has been accomplished by providing thicker walls. However, relatively thick walls present the problem of material cost and are viewed as environmentally unfriendly.

Attempts to provide various geometries and selective thickness, are shown in U.S. Pat. Nos. 5,152,411; 7,028,866 7,303,087 and in WO 2011/088093. But these approaches have not proven entirely satisfactory. For example, under pressure and with certain product chemistries, including perfumes and organic materials, crazing can occur. Crazing is the appearance of small cleaves in the plastic, resembling cracks. Crazing is undesirable from both an aesthetic and functional point of view.

Another attempt to overcome the problems of pressurized plastic containers is to crystallize the plastic in certain portions of the container as shown in U.S. Pat. Nos. 4,151,250; 4,264,558; 4,385,089; 4,476,170; 4,512,948; 4,522,779; 4,755,404; 4,839,127; 4,871,507; 4,883,631; 5,261,545; 5,419,866; 5,520,877; 5,735,420; 5,759,656; 5,829,614; 5,908,128; 6,168,740; 6,372,318; 6,497,569 a divisional of U.S. Pat. Nos. 6,168,740; 6,514,451; and 6,926,859. But these teachings have been unsatisfactory in showing how to crystallize a plastic aerosol outer container to prevent crazing and other undesirable manufacturing artifacts.

SUMMARY OF THE INVENTION

The invention comprises a pressurized or pressurizable outer container usable for/as an aerosol dispenser. The outer container has an opening for optionally receiving a valve cup, neck depending from the top opening, a shoulder subjacent thereto and a body below the shoulder. The lower portion of the neck and optionally the shoulder are thermally crystallized. Such crystallization is believed to improve strain resistance/product absorption and thereby reduce crazing. The invention also comprises a preform therefor and an aerosol dispenser having such an outer container.

BRIEF DESCRIPTION OF THE DRAWINGS

FIG. 6A is a frontal view of an outer container, showing sample locations for determining relative crystallizations.

FIG. 6B is a top plan view of the outer container of FIG. 6A.

FIG. 6C is a top plan view of an asymmetrical outer container.

DETAILED DESCRIPTION OF THE INVENTION

Figure 1A:
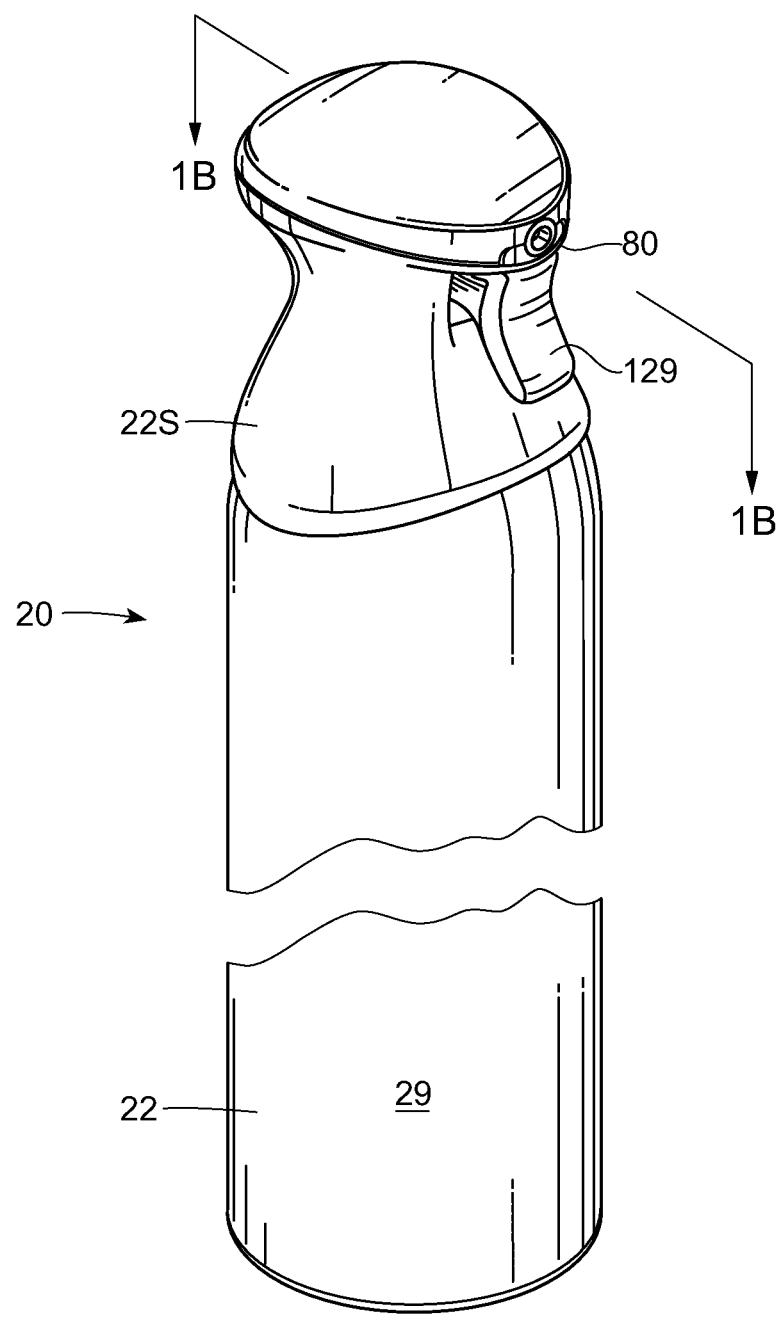
FIG. 1A is a perspective view of an aerosol dispenser according to the present invention having a plastic outer container.
Figure 1B:
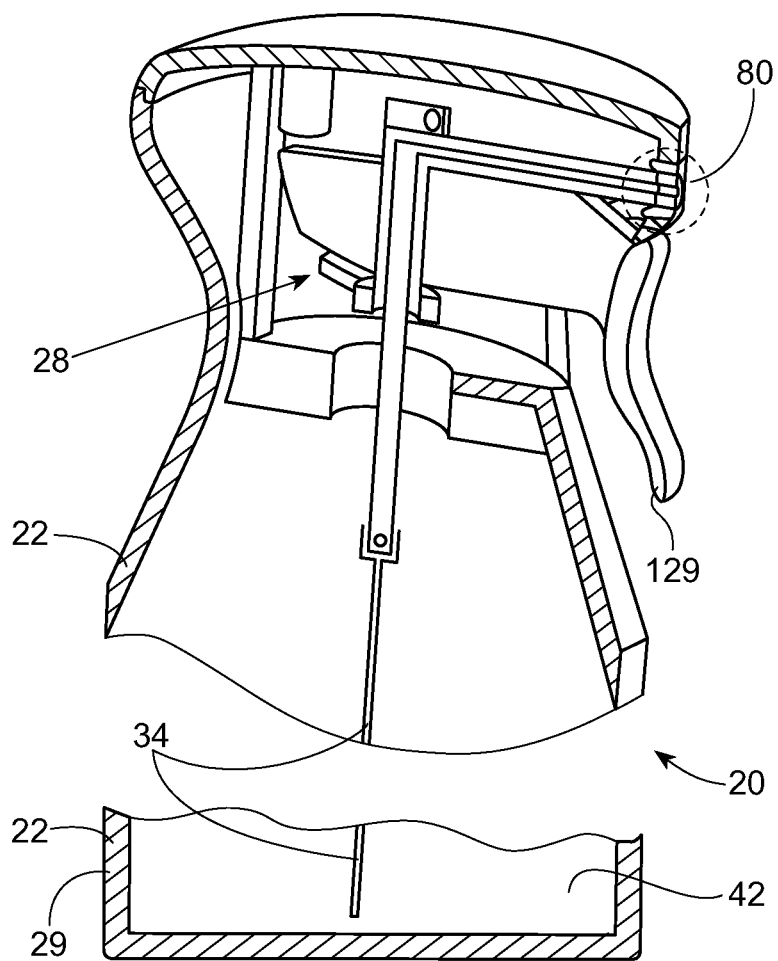
FIG. 1B, is a vertical sectional view of an aerosol dispenser, taken in the direction of arrows 1B-1B in FIG. 1A and having an optional dip tube.
Figure 1C:
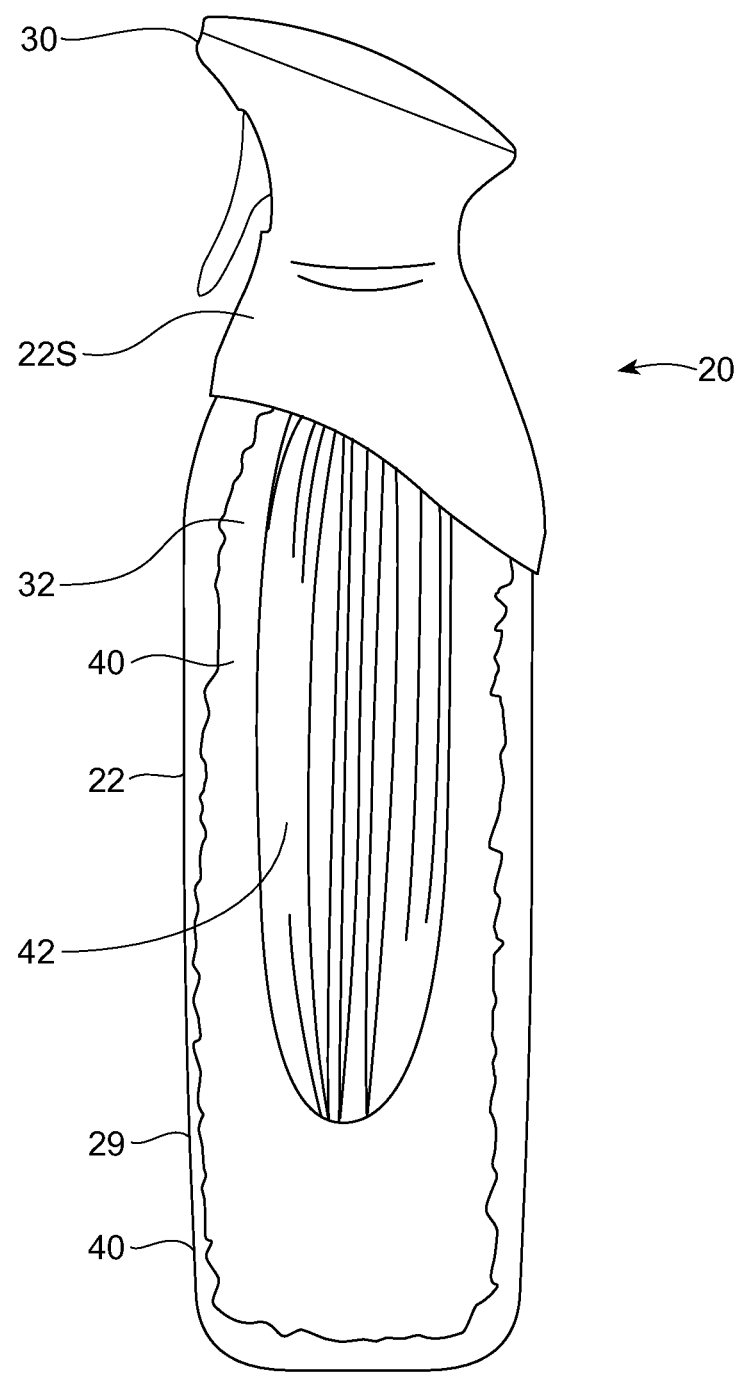
FIG. 1C is a frontal view of an aerosol dispenser shown partially in cutaway, and having an optional bag-on-valve assembly.

Referring to FIGS. 1A, 1B and 1C, an aerosol dispenser 20 is shown. The aerosol dispenser 20 comprises a pressurizable outer container 22 usable for such a dispenser 20. The aerosol dispenser 20 may comprise a valve cup for holding a valve assembly 28, a valve assembly 28, a bag 32 on valve 28 and/or dip tube 34 as are known the in the art. The bottom of the outer container 22 may comprise a base.

The outer container 22 may be pressurizable and, optionally pressurized as desired. Thus, the outer container 22 of the present invention may be used as a component in an aerosol dispenser 20, particularly when pressurized. Or, the outer container 22 may be used as a container for granular or liquid products, etc.

The aerosol dispenser 20 may comprise a valve assembly 28. Selective actuation of the valve assembly 28 allows the user to dispense a desired quantity of the product 42 on demand. Illustrative and nonlimiting products 42 for use with the present invention may include shave cream, shave foam, body sprays, body washes, perfumes, cleansers, air fresheners, astringents, foods, paints, etc. If a perfume is included, the perfume may be made according to commonly assigned U.S. Pat. No. 8,101,124, columns 8-15, and comprise known perfume raw materials.

A trigger 129 may be used to dispense product 42 through a nozzle 80 at the point of use. Optionally, the top portion of the outer container 22 may be crowned with a shroud 22S.

Inside the outer container 22 may be a collapsible bag 32 as known in the art. The collapsible bag 32 may hold product 42 therein, and prevent intermixing of such product 42 with propellant 40. The propellant 40 may be stored outside the collapsible bag 32, and inside the outer container 22.

This product delivery device may alternatively or additionally comprise a dip tube 34. The dip tube 34 extends from a proximal end sealed to the valve assembly 28. The dip tube 34 may terminate at a distal end juxtaposed with the bottom of the outer container 22. This embodiment provides for intermixing of the product 42 and propellant 40. Both are co-dispensed in response to selective actuation of the valve assembly 28 by a user.

Figure 2:
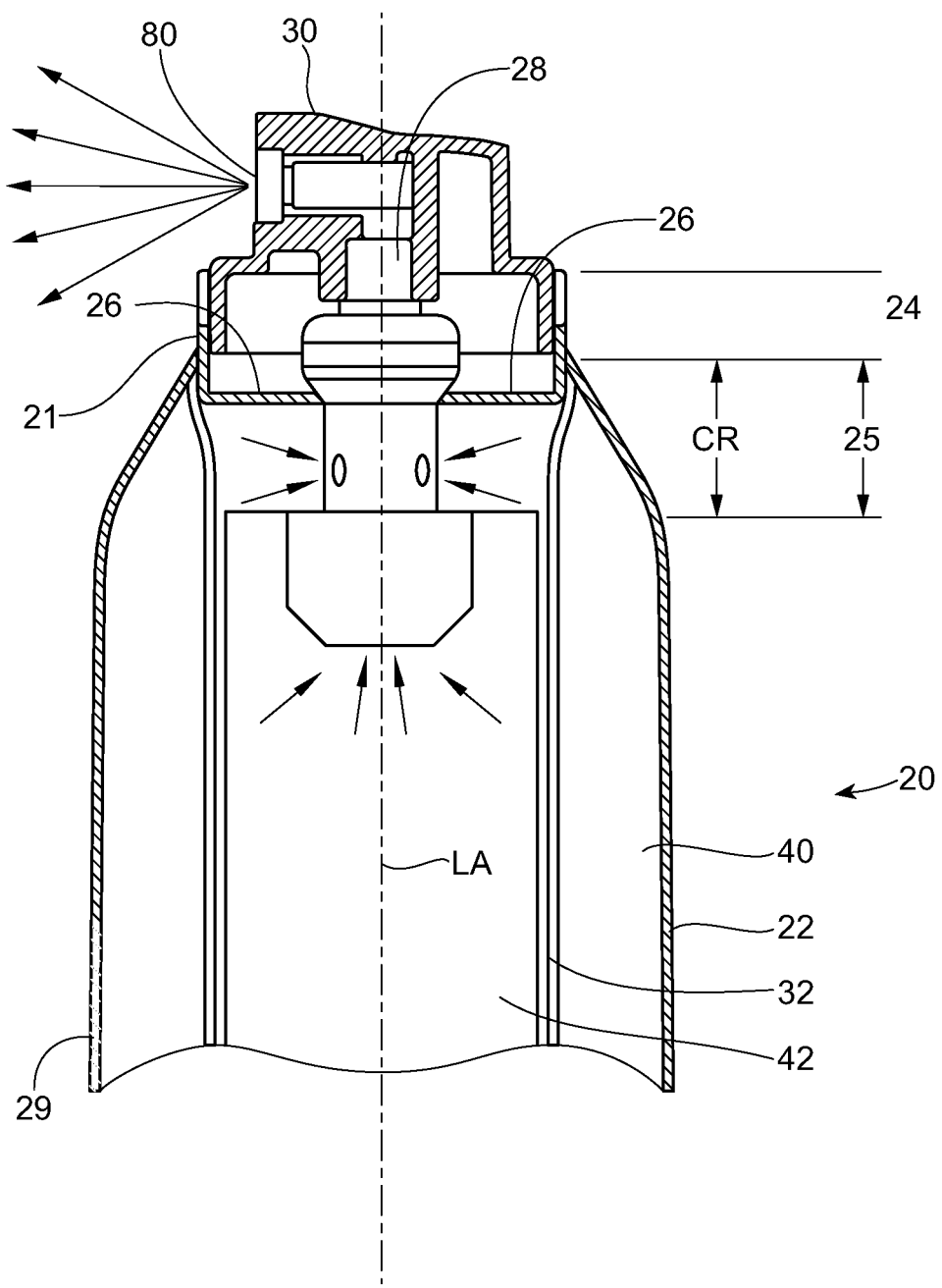
FIG. 2 is a fragmentary sectional view of an aerosol dispenser according to the present invention having a push top actuator.

Referring to FIG. 2, a plastic or metal valve cup 26 may be sealed to the opening 21 of the outer container 22. A valve assembly 28, in turn, may be disposed within the valve cup 26. The valve assembly 28 provides for retention of product 42 within the aerosol dispenser 20 until the product 42 is selectively dispensed by a user. The valve assembly 28 may be selectively actuated by an actuator 30. Neither the valve assembly 28 nor the actuator 30 form any part of the claimed invention.

Figure 3A:
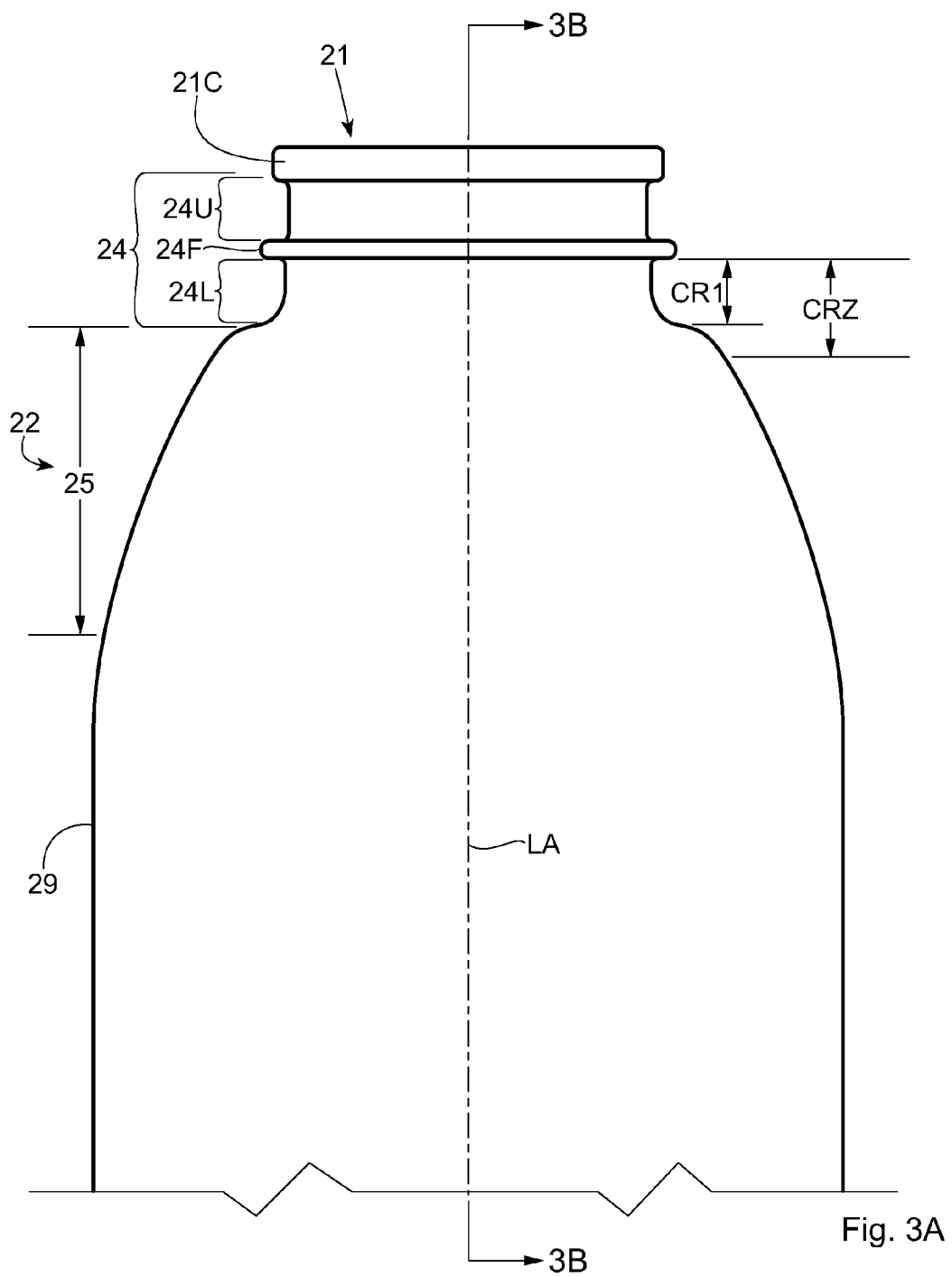
FIG. 3A is a fragmentary, frontal view of an outer container according to the present invention having a flange and being usable to make an aerosol dispenser according to the present invention.
Figure 3B:
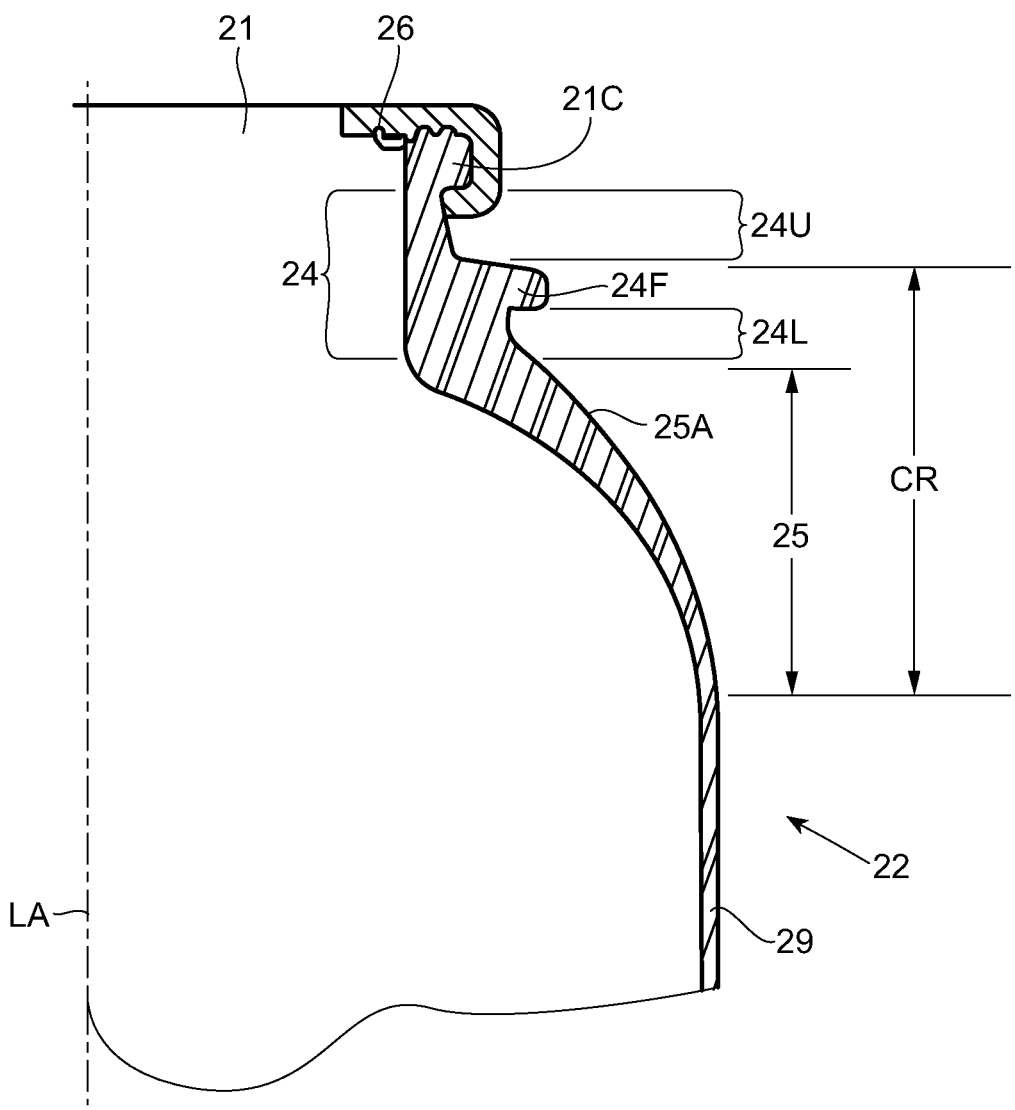
FIG. 3B is a fragmentary, vertical sectional view taken along lines 3B-3B of FIG. 3A.

Referring to FIGS. 3A-3B, the aerosol dispenser 20, and components thereof, particularly the outer container 22, may have a longitudinal axis LA, and may optionally be axisymmetric with a round cross section, for improved pressure control. The sidewall 29 of the outer container 22 may be arcuate, and particularly have an oval or round cross section. Alternatively, the outer container 22, and particularly the neck 24, shoulder 25 and/or body thereof, etc., may be eccentric and have a square, elliptical, oval, irregular or other cross section. Furthermore, the cross section may be generally constant as shown, or may be variable. If a variable cross-section is selected, the outer container 22 may be spherically shaped, barrel shaped, hourglass shaped, or monotonically tapered.

The outer container 22 may range from 6 to 40 cm in height, taken in the axial direction and from 4 to 60 cm in diameter if a round footprint is selected, with other geometries also being feasible. The outer container 22 may have a volume ranging from 115 to 1000 cc exclusive of any components therein. The outer container 22 may be injection stretch blow molded. If so, the injection stretch blow molding process may provide a planar stretch ratio greater than about 8, 8.5, 9, 9.5, 10, 12, 15 or 20 and less than about 40, 30 or 25.

Referring back to FIGS. 1A, 1B and 1C, the outer container 22 may sit on a base. The base is disposed on the bottom of the outer container 22 and of the aerosol dispenser 20. Suitable bases include petaloid bases, champagne bases, hemispherical or other convex bases used in conjunction with a base cup, as shown in commonly assigned US publication 2009/0050638A1. Or the outer container 22 may have a flat base with an optional punt. If desired, the bottom of the container may comprise radially oriented internal and/or external ribs. The ribs may be of like or different geometry, and be spaced outwardly from the longitudinal axis LA. Each rib may intercept the sidewall of the outer container 22 and may be equally circumferentially spaced from adjacent ribs.

Propellant

The outer container 22 may be pressurized to an internal gage pressure of 100-1300, kPa and discharged to a final propellant 40 gage pressure of 0 to 120 kPa. The pressurizeable container 22 may further include a propellant 40. The propellant 40 may be disposed between the outer container 22 and the valve assembly 28. Alternatively propellant 40 may be disposed in the outer container 22 and/or in the collapsible bag 32.

Any suitable propellant 40 may be used. The propellant 40 may comprise a hydrocarbon as known in the art, nitrogen, air and mixtures thereof. Propellants 40 listed in the US Federal Register 49 CFR 1.73.115, Class 2, Division 2.2 are considered acceptable. The propellant 40 may particularly comprise a Trans-1,3,3,3-tetrafluoroprop-1-ene, and optionally a CAS number 1645-83-6 gas.

Such propellant 40 provides the benefit that they are not flammable, although the invention is not limited to inflammable propellant 40. One such propellant 40 is commercially available from Honeywell International of Morristown, N.J. under the trade name HFO-1234ze or GWP-6.

If desired, the propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user. A condensable propellant 40 provides the benefit of a flatter depressurization curve as product 42 is depleted during usage.

Referring to FIGS. 1A-4C, the outer container 22 may comprise a plastic pressurizeable container. The plastic may be polymeric, and particularly substantially or entirely comprise PET and/or PEN. The valve assembly 28, and optional valve cup 26 may be welded to the neck 24 of the outer container 22, as discussed below. If desired, valve cup 26, valve assembly 28, dip tube 34 and/or collapsible bag 32 may be polymeric. By polymeric it is meant that the component is formed of a material which is plastic, comprises polymers, and/or particularly polyolefin, polyester or nylons. Thus, the entire aerosol dispenser 20 or, specific components thereof, may be free of metal, allowing for exposure to microwave energy.

Referring to FIGS. 1A-2, if desired, the outer container 22, optional valve cup 26, and/or other components of the aerosol dispenser 20 may be made of sustainable materials and/or combinations and blends of sustainable and other materials. Suitable sustainable materials include polylactic acid (PLA), polyglycolic acid (PGA), polybutylene succinate (PBS), an aliphatic-aromatic copolyester optionally with high terephthalic acid content, an aromatic copolyester optionally with high terephthalic acid content, polyhydroxyalkanoate (PHA), thermoplastic starch (TPS) and mixtures thereof. Suitable materials are disclosed in commonly assigned U.S. Pat. No. 8,083,064.

If desired, the outer container 22, collapsible bag 32, and/or dip tube 34, may be transparent or substantially transparent. If both the outer container 22 and a collapsible bag 32 are transparent, this arrangement provides the benefit that the consumer knows when product 42 is nearing depletion and allows for improved communication of product 42 attributes, such as color, viscosity, etc. Also, labeling or other decoration of the container may be more apparent if the background to which such decoration is applied is clear. Alternatively or additionally, the outer container 22, collapsible bag 32, etc. may be transparent and colored with like or different colors.

Referring particularly to FIGS. 3A-3B, as the top of the outer container 22 is approached, the outer container 22 may have an opening 21. An optional crimp ring 21C may be circumjacent, and in a degenerate case circumscribe the opening 21. The optional crimp ring 21C may provide for attachment of an optional valve cup 26 as is known in the art.

Below the optional crimp ring 21C, is a neck 24. The neck 24 may be of constant or variable cross section. The neck 24 may have an optional flange 24F. The optional flange 24F may extend radially outward from the neck 24, as shown and/or may extend radially inwardly. The flange 24F may circumscribe the neck 24 or may be interrupted at various positions around the circumference to be discontinuous. The outer container 22 may have a step in the outer wall of the neck 24. Such an outer container may be made according to U.S. Pat. No. 6,971,530, FIGS. 4 and 7.

The flange 24F may be disposed near the axial center of the neck 24, as shown, or may be juxtaposed with the top or bottom of the neck 24. The flange 24F may divide the neck into an upper portion 24U and a lower portion 24L.

The neck 24 may have a lesser thickness at the top portion 24U than at lower portion 24L, or vice versa, to provide a differential thickness.

The lower portion 24L of the neck 24 may be above and/or superjacent the shoulder 25 of the outer container 22. The shoulder 25 may flare radially outwardly from the lower portion 24L in a first transition region. The shoulder 25 may connect to the container sidewall 29. The shoulder 25 may particularly be joined to the sidewall 29 by a radius or second transition region. The shoulder 25 may have an annular flat. The outer container 22 sidewall also defines a diameter if a round cross section is selected for the body.

Referring to FIGS. 3A and 3B, the lower portion 24L, shoulder 25 and transition to the sidewall 29 may be crystallized. Crystallization may be accomplished by thermal treatment and/or by strain treatment. The base, balance of the sidewall 29, flange 24F, upper portion 24U and crimp ring 24C may be amorphous, i.e. un-crystallized or may be crystallized.

By crystallized, it is meant that the particular portion of the outer container 22 under consideration has a crystallized region CR with a crystallization of at least about 10, 15, 20, 25, 30, 35 or 40 percent, but not more than about 60, 55 or 50 percent. The crystallization may be uniform throughout the thickness of the outer container 22 at the point under consideration, may have a gradient throughout the thickness, or may occur only part way through the thickness.

For example, the crystallization may occur throughout 10, 20, 30, 40, 50 percent or more of the wall thickness of the crystallized region CR. The outer container 22 may have a wall with an inner surface portion having an inner surface crystallinity and an outer surface portion opposed thereto having an outer surface crystallinity, and a midpoint therebetween having a midwall crystallinity. The inner surface crystallinity and outer surface crystallinity may be greater than or less than the midwall crystallinity. Or the outer container wall 22 may have a crystallinity gradient which monotonically increases or decreases between the inner surface and outer surface.

Referring particularly to FIG. 3B, the crystallized region CR 1 may extend from the bottom of the flange 24F to the top of the shoulder 25. Alternatively, the crystallized region CR 2 may extend from the bottom of the flange 24F into the shoulder 25. Or the crystallized region CR 2 may extend further down into the shoulder 25 region.

Optionally, the entire outer container 22 may be crystallized. Or just the lower portion 24L of the neck 24, the shoulder 25 and/or transition to the sidewall 29 may be crystallized. The balance of the container 22, including the bottom, the base, the sidewall 29, upper neck portion 24U, flange 24F and/or crimp ring 21C may be amorphous and not thermally crystallized.

A round opening 21 and/or neck 24 are described herein for simplicity. But other shapes are feasible and within the scope of the claimed invention. If a different shape is utilized for the neck 24, flange 24F and/or shoulder 25, the analyses below are still applicable. Simple congruent shapes, corresponding to the shapes of the neck 24, flange 24F and/or shoulder 25, may be used for the analyses.

All measurements, and particularly diameters, described herein are taken from the inside of the respective neck 24, flange 24F, shoulder 25, crystallized region CR, sidewall 29 and/or other feature of the container 22 unless otherwise specified. As used herein, R specifically refers to the minimum internal radius of the neck 24, commonly referred to as the "I" dimension by the Society of the Plastics Industry.

The shoulder 25 is intermediate the lower portion 24L of the neck 24 and the sidewall 29. The shoulder may have a definable apex 25A. As seen in section, the apex 25A of the shoulder 25 is the point on the shoulder 25, which intercepts both the shoulder 25 and a tangent line TL. The tangent line TL is oriented 45 degrees from the longitudinal axis LA. One of skill will recognize that the apex 25A of the shoulder 25 forms a circle when the entire shoulder 25 of a round container 22 is considered.

The crystallized region CR may be juxtaposed with the apex 25A. The crystallized region CR may extend upwardly from the apex 25A towards the opening 21 and downwardly towards the bottom of the outer container 22. If the shoulder 25 has a definable apex 25A, the crystallized region CR may extend upwardly, parallel to the longitudinal axis LA, from the apex 25A a distance of about 0.3R, 0.4R or 0.5 and towards the base any convenient distance.

Figure 4A:
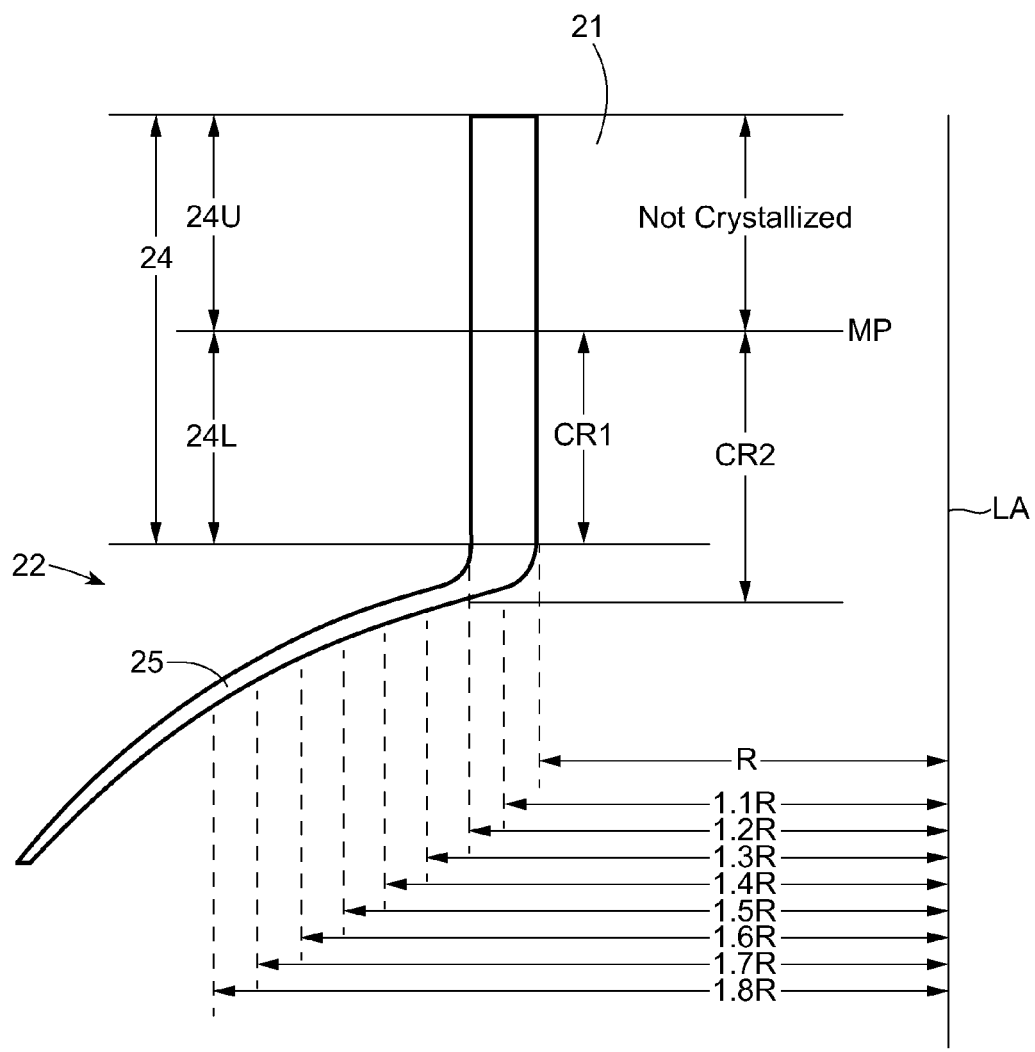
FIGS. 4A, 4B, 4C are fragmentary vertical sectional views of outer containers not having an optional flange, having different regions which are crystallized and showing the respective axial midpoints of the necks of such outer containers.
Figure 4B:
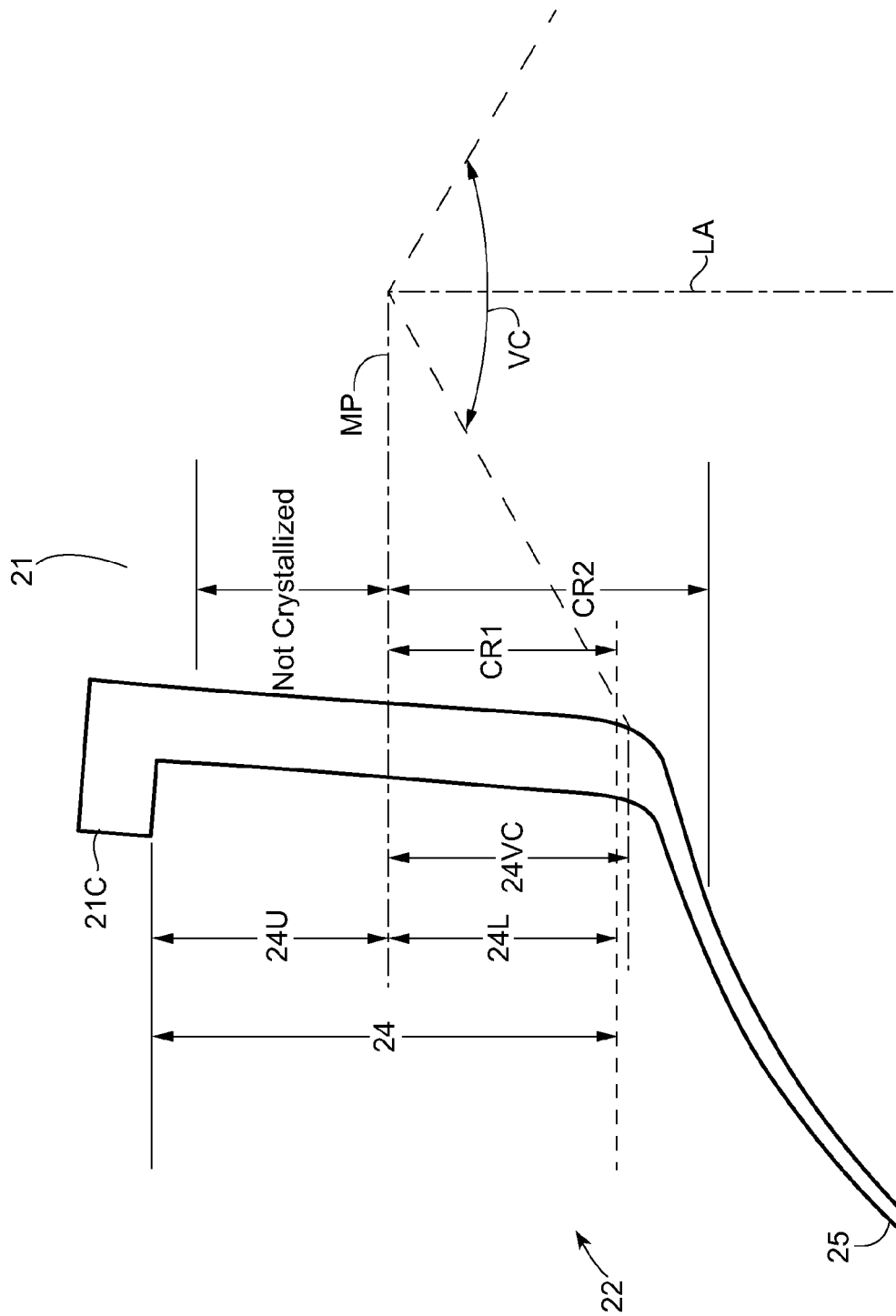
Figure 4C:
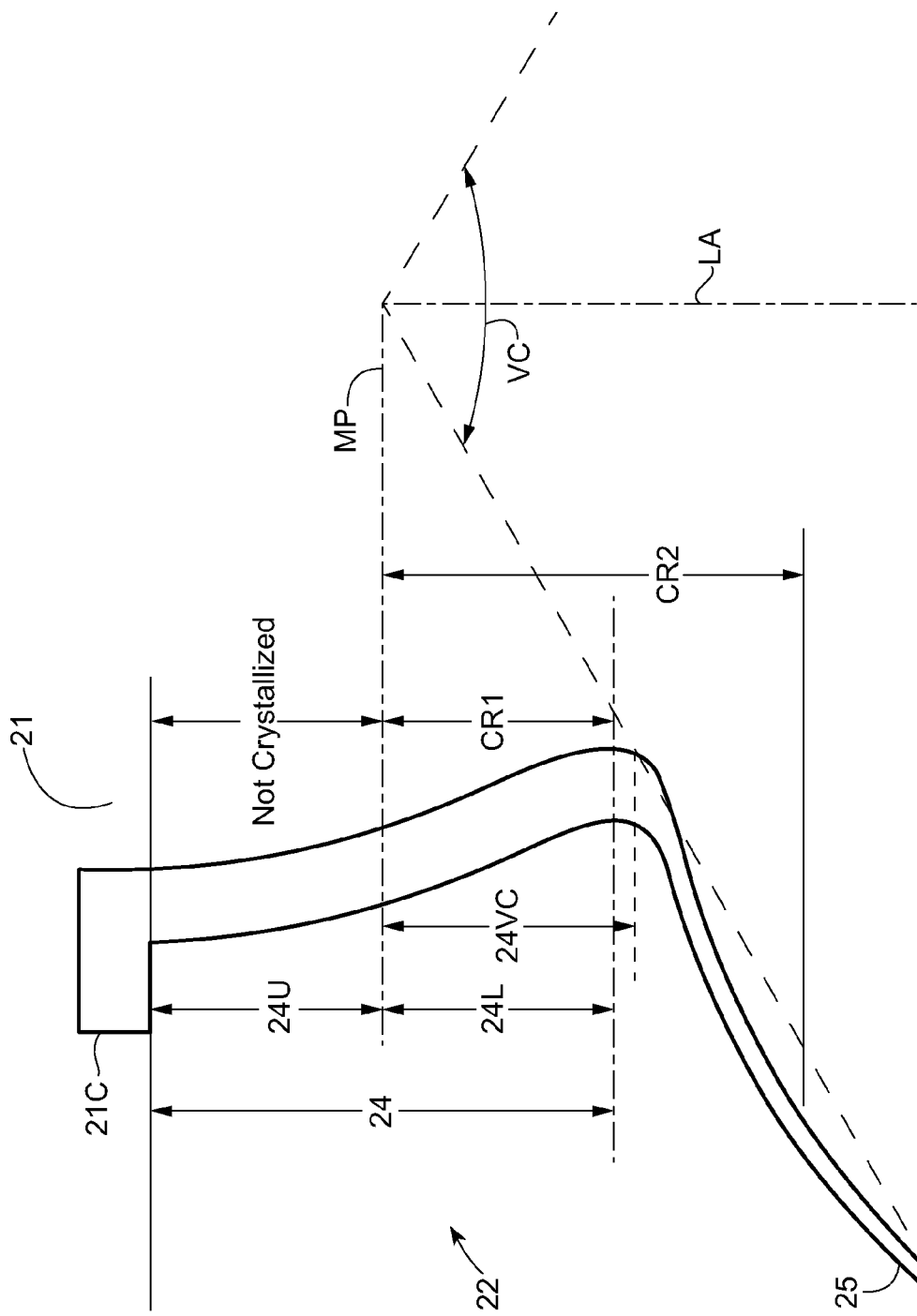

Referring to FIGS. 4A, 4B, and 4C, the outer container 22 may not have the optional flange 24F. In such case, the crystallized region CR1, CR2 may be taken as a region below the axial midpoint MP of the neck 24. Referring particularly to FIG. 4A, in determining the axial midpoint MP of the neck 24 only the portion of the neck 24 having constant cross section, if present, is considered. Referring to FIGS. 4B-4C, if the neck 24 has a variable cross section, the axial midpoint MP is that point of the neck 24 intermediate and midway between the underside of the optional crimp ring 21C and the start of the shoulder 25. If the outer container 22 does not have a crimp ring 21C, the top of the neck 24 is utilized instead. The axial midpoint MP of the neck 24 may be used in addition to or in place of the flange 24F for purposes described and claimed herein.

Referring particularly to FIG. 4A, the crystallized region CR2 may be thought of as a multiple of the radius R of the neck 24. The crystallized region CR2 may be thought of as comprising that annular region of the container 22 including or below the lower portion 24L of the neck 24 and having a radius ranging from a minimum of about 1R, 1.1R, 1.2R, 1.3R or 1.4R to a maximum of about 1.8R, 1.7R or 1.6R. The crystallized region CR2 is shown as terminating at 1.2R, although one of skill will recognize the invention is not so limited, and that such crystallized region CR2 may terminate at any of the aforementioned radii. Referring particularly to FIGS. 4B and 4C, the crystallized region 24VC may be thought of as defined by a virtual cone VC. The virtual cone VC may have a vertex coincident the longitudinal axis LA and disposed at a position coincident the bottom of flange 24F or axial midpoint MP. The cone VC may flare out at an included angle of 120 degrees, with 60 degrees being diametrically opposed from the longitudinal axis LA on all sides.

The crystallized region CR may be thought of as that annular region of the container 22 between the inner surface intercepted by the cone VC at about 1.4R, 1.5R or 1.6R and the bottom of flange 24F or axial midpoint MP.

Referring collectively to FIGS. 3A-4C, alternatively, the crystallized region CR may begin at the bottom of the flange 24F or the axial midpoint MP, and extend axially downward therefrom towards the base a distance of at least about 2, 3, 4, 5, 6, 8, 10 or 12 mm. In yet another embodiment the crystallized region CR may begin at the bottom of the flange 24F or the axial midpoint MP and extend vertically downward therefrom towards the base a distance of at least or terminating at about 0.1R, 0.2R, 0.3R, 0.4R or 0.45R.

If a flange 24F is not present, tabs or other radially extending features disposed on the neck 24, may be used in place of the flange 24F to designate the upper bound of the crystallized region CR. If a flange 24F, or other radially extending features, are not present on the neck 24, the axial midpoint MP of the neck 24 may be used in place thereof.

Figure 5:
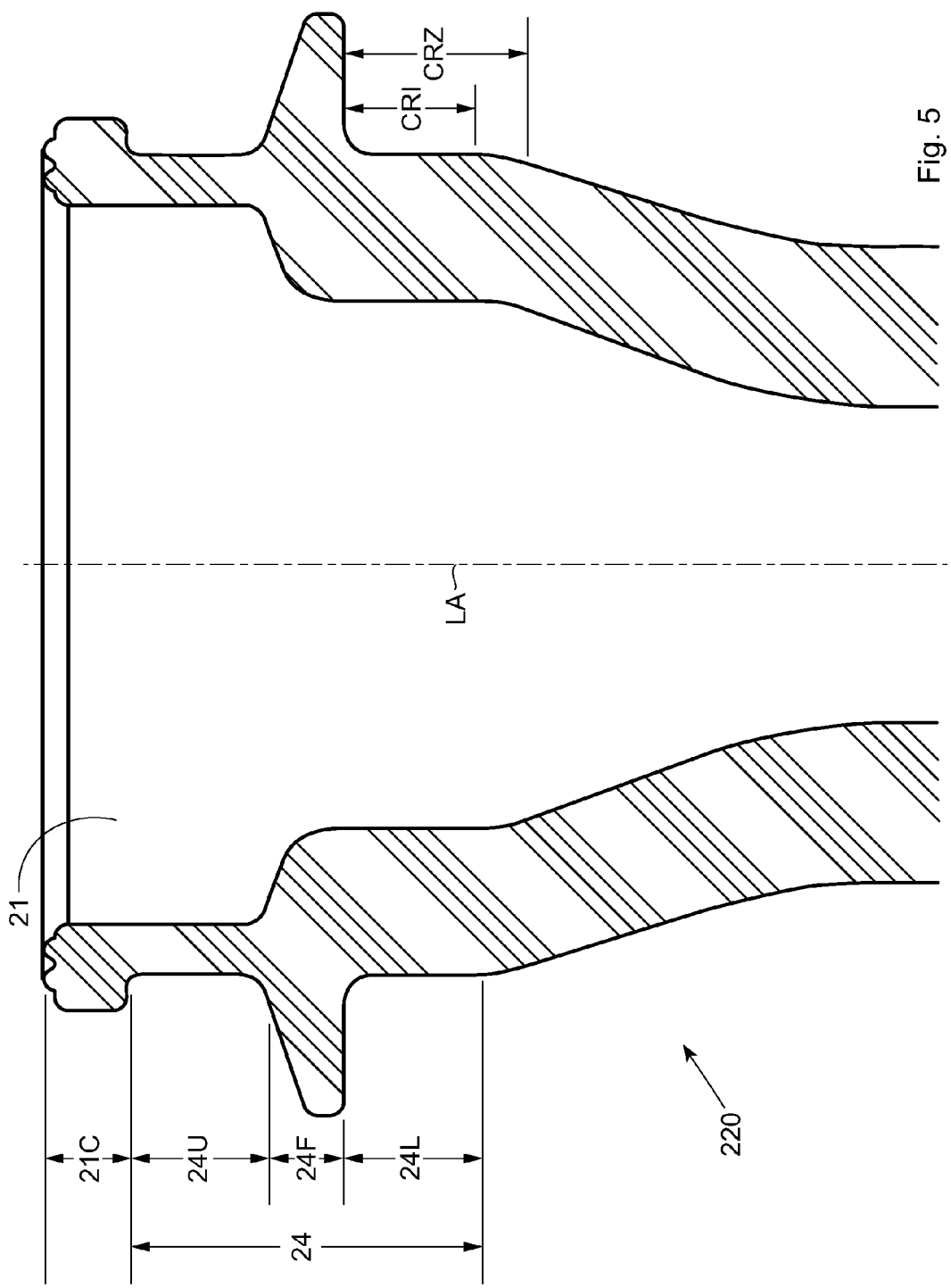
FIG. 5 is a fragmentary, vertical sectional view of a preform according to the present invention and being usable to make an outer container according to the present invention.

Referring to FIG. 5, the invention may also be embodied in a preform 220 as is well known in the art. The preform 220 may be injection molded, using well known techniques. The preform 220 may have a crystallized region CR1, CR2, as described herein.

If any one or more of the above criteria defining the crystallization region CR is/are met, the preform 220, outer container 22 or aerosol dispenser 20 is judged to fall within the claim scope, unless otherwise defined or specified.

Additionally or alternatively, the crystallinity may be considered as the relative crystallinity of one portion of the outer container 22 relative to another. Particularly, the shoulder 25 may have a crystallization which is at least about 1.3, 1.4, 1.5 or 1.6 times greater than but not more than 2.9, or 1.9 times greater than the crystallinity of the sidewall 29.

The outer container 22 may be injection stretch blow molded (ISBM) as is well known in the art and described in U.S. Pat. No. 7,303,087 at 4:61-5:5. Additionally the containers 22 may be injection blow molded or extrusion blow molded. If ISBM is selected, a 1 step, 1.5 step or 2 step process may be used.

Polymeric materials suitable for the current invention may be selected from the semi-crystalline class of materials. Semi-crystalline polymers contain amorphous regions that are generally clear and contain transparent surrounding small regions of crystallized material or crystallites. The crystallized regions of the material may have localized ordering of the polymeric chains producing these crystallites or higher density regions of closely packed polymer chains. Amorphous polymers are generally transparent to visible light. But when the crystallites present in the structure grow to sizes in excess of about 400 nm, they scatter visible light and make the material translucent (hazy) or opaque. One of skill can make an initial determination whether or not an outer container 22 and/or a preform 220 is thermally crystallized in a region of interest by white translucent and/white opaque appearance in that crystallized region CR.

Without being bound by theory, semi-crystalline polymers can be present as an amorphous material even though the crystalline structure represents a more thermodynamically favorable state. Above the crystalline melting temperature ($T_m$) the polymer chains have too much energy for the formation of stable ordered structures and the material is thus amorphous in the melt. Below the Tm of the material, these ordered crystallites can form when sufficient energy remains for segmental motion so that the polymer chains can rearrange into the more favorable thermodynamic structures. As the temperature is decreased to the point where the mobility of the chain segments is insufficient for rearrangement, the polymer becomes glassy. The temperature range between this glass transition temperature (Tg) and the melt temperature (Tm) is where crystallization of the polymer can occur through rearrangement.

Crystallization of the material can occur in this temperature range either by cooling from the melt or heating from the glassy state. Once the material is cooled below the glass transition, the material is essentially frozen into the existing order. If a crystallizable polymer is rapidly cooled from the melt to below the Tg without sufficient time for rearrangement of the relatively long polymer chains, a stable amorphous state can be attained even for the semi-crystalline material.

While the temperature range for crystallization lies between the Tg and Tm, the rate of crystallization and crystal growth for a semi-crystalline polymer are determined by the temperature of crystallization as well as other characteristics of the polymer. These characteristics include the chemical structure of the polymer, molecular weight and molecular weight distribution, co-monomer content, and any additives present. Additives can include nucleating or reheat agents as well as plasticizers such as moisture or low molecular weight organics. For a given semi-crystalline polymer, the rate of crystallization can be described by the half time for crystallization ($t_{1/2}$). The $t_{1/2}$ is the time required to reach 50% of the equilibrium level of crystallinity for a polymer at a given temperature. A plot of $t_{1/2}$ versus temperature will generally show a broad minimum between the melting and glass transition temperatures with the curve asymptotically approaching infinity at both Tg and Tm.

Crystallization of polymers can also or alternatively be accomplished by orientation of the polymer chains through applied strain. As the polymer sample is stretched, the randomly oriented chains begin to align in the drawing direction. The chain alignment lowers the free energy barriers for the nucleation and subsequent growth of crystallites. The morphology is different in that these strain induced crystallites are smaller and more elliptical when compared to the isotropic, spherulitic crystallites found with thermally crystallized samples. Both the strain rate used in the orientation process as well as the temperature will affect the final degree of orientation and crystallinity. Higher strain rates provide less time for the relaxation of the chain segments and enhance the effect orientation and crystallization while lower strain rates allow for greater elongation since this segmental relaxation effect can occur more quickly than the chain orientation. For a given strain rate, higher temperatures can cause a reduction in both the degree of orientation and crystallization due to this same relaxation phenomena.

Crystallization of the neck 24 may be accomplished by thermal treatment and/or by strain treatment. For the current embodiment, strain treatment may be accomplished through the stretch blow molding processing of the heated preform into the final outer container 22 shape. In this process, the preform may be heated to approximately 20° C. above the glass transition temperature of the material before being subjected to stretching and shaping into the final shape by the stretch blow molding process. The process inherently creates a continuum of orientations from the unstretched region of the lower portion of the neck 24L through the shoulder 25 to the stretched sidewall 29 of the outer container 22. For a substantially amorphous preform 220, this strain treatment may yield a crystallized region CR between the unstretched and uncrystallized (amorphous) neck 24 and the oriented and crystallized sidewall 29. Minimizing this crystallized region CR in the preform 220 and/or outer container 22 enable designs that transitions to the fully oriented outer container 22 wall and may reduce crazing, and also reduce the stress transferred to this region by the rest of the pressurized outer container 22.

Thermal treatment of the crystallized region CR between the neck 24L and the sidewall 29 may be accomplished by heating this region to a point between the Tg and Tm of the material. This thermal treatment of the material allows for the rearrangement of the polymer chains to form crystallites where the orientation from the stretch blow molding process was insufficient to raise the overall crystallinity. This thermal treatment of the crystallized region CR, to increase the overall crystallinity of that region, can be accomplished by treating the corresponding region of the outer container 22, and particularly the preform 220 therefor prior to blow molding and/or by treating the final outer container 22 post blow molding.

In an embodiment, thermal crystallization of the outer container 22 preform 220 can be targeted to an area corresponding to the crystallized region CR on the final outer container 22. The crystallized preform 220 can then be processed in the stretch blow molding process. The crystallinity may be generated by annealing the material at a temperature between Tg and Tm. The annealing temperature can be reached by heating the preform 220 from the glassy state or by cooling the preform 220 from the melt state.

The preform 220 can be heated to the annealing temperature through the use of electromagnetic radiation and/or by contacting one or more surfaces of the preform 220 with a heated surface or heated fluid. The preform 220 can alternatively be cooled to the annealing temperature from the melt state during the molding process where the latent heat from the melt state is the source of the thermal energy to add crystallinity in a specific region of the part, as described in U.S. Pat. No. 6,168,740 at column 12: lines 1-16. Quench cooling may also or alternatively be utilized to provide control of the crystallinity thus obtained. A heat shield, optionally water cooled, may be used to control radiation exposure as desired.

Thermal crystallization of a preform 220 or an outer container 22 may be accomplished by exposure to electromagnetic radiation. This process provides a non-contact means for controllably heating the preform 220 or outer container 22. In one embodiment, the radiation comprises or consists of infrared (IR) energy that is focused in the area of interest on the preform 220 and/or outer container 22. The characteristics of the focused radiation (intensity, frequency, view angle), the use of convective cooling air on the exposed surfaces, and the duration of the heating process determine the distribution and percentage of the induced crystallinity.

In addition to the base polymer, machine and process settings, the presence of reheat additives (both particulate and chromaphores) as well as plasticizers may be used to enhance both the rate of crystallization and the uniformity of the crystallization through the cross section of the part. Without being bound by theory, the enhanced rate and uniformity may be partly due to the relatively low energy absorption rate of IR energy by materials such as PET. The ability of the energy to penetrate the entire thickness of the wall may prevent overheating of the surface exposed to the incident, actinic radiation. A wavelength of 500-3,000 nm may be used.

Moisture can be present in the preforms 220 as a contaminant due to the hygroscopic nature of PET. The process of making preforms 220 involves drying the resin to generally less than 50 ppm of water. Residual moisture may be consumed by reaction in the melt during the injection molding process. Such performs 220 may absorb moisture from the ambient air after molding. Thus, the crystallization process may be conducted within about 90, 60, 30 or 15 minutes of injection molding the preform 220, in order to reduce absorption of moisture into the preform 220 surfaces.

Alternatively, the crystallization can be delayed to a time when the preform 220 has equilibrated with the environment, i.e. has uniformly absorbed moisture throughout the wall thickness, so that the enhanced IR absorption and plastization of the PET structure does not lead to excessive crystallinity on the inner and outer surfaces relative to the inner portion of the wall. This equilibration time can range from two days to four or more weeks, depending on the ambient storage conditions and the thickness of the wall in the area of interest.

Thermal crystallization of a preform 220 and/or outer container 22 may also occur by contact heating. The preform 220 and/or outer container 22 may be selectively thermally crystallized by exposing one or more surfaces of the part to a heated object or fluid. The heat may be transferred to and through the preform 220 and/or outer container 22 by conduction, as described in U.S. Pat. No. 6,168,740 using the molding system or may be done outside the injection molding machinery, as are known in the art.

Thermal crystallization of the preform 220 during the molding process may alternatively be accomplished by the use of active heating or passive cooling (insulative) features in the preform 220 injection mold. The process to generate thermal crystallinity in preforms 220 via the molding process has been described in U.S. Pat. No. 6,168,740 at 12:38-54.

Thermal crystallization of the crystallized region CR of a post-stretching formed outer container 22 can be accomplished during the stretch blow molding process through the use of higher preform 220 molding temperatures and heated blow molds, similar to the methods used to manufacture heat set outer containers 22. In conventional stretch blow molding, the outer container 22 wall 29 may increase in crystallinity from the biaxial orientation of the preform 220. Such morphology may be locked into the structure by rapidly cooling the outer container 22 through contact with a relatively cooler mold surface.

In contrast, heat set outer containers 22 may be manufactured using mold temperatures from 120 to 165, and particularly 140 degreesC, with a range of 135 to 165 degrees C. being suitable for PET. In the prior art the outer container 22 wall is typically cooled sufficiently to maintain a stable shape by blowing cooling air onto the interior outer container 22 surface through channels in the stretch rod. The longer residence time at temperatures near the maximum crystallization rate for the polymer allows for additional thermal crystallization of the material after stretching. While the outer container 22 wall of a heat set outer container 22 can have total crystallinity levels in excess of about 30%, the crystallized region CR of such an outer container 22 does not have this same level of crystallization since this area lacks crystallization from orientation. One heat set process known in the art has used a cooled mold insert for the outer container 22 neck to provide better dimensional control for this area of the outer container 22.

By maintaining relatively higher mold temperatures in the lower neck area 24L extending into the crystallized region CR, the heat set process of the present invention can add thermal crystallinity to this crystallized region CR of the outer container 22. One embodiment of the present invention may combine the aspects of heat set blow molding technology including this heated crystallized region CR with the thermally crystallized preform 220 transition to provide a predetermined, incremental increase in crystallization in the crystallized region CR.

Example 1

With continuing reference to FIG. 5, preforms 220 having a geometry suitable for the intended blow molded article were molded from a DAK Americas Laser+ C91A, polyethylene terephthalate resin. The preforms 220 were equilibrated at ambient temperature and humidity conditions for 30 days following the injection molding process.

The preforms 220 were thermally crystallized by infrared (IR) treatment using a Sidel SBO1/2 injection stretch blow molding line modified for this purpose. The modifications included using a solid polished ventilation reflector having an approximately 5 cm tall horizontal continuous slot disposed at the bottom of the reflector. This continuous slot provided a concentrated flow of convective cooling air to the finish and neck region of the preform 220 during heating. Another modification included the addition of a Sidel Series II Quartz Bar assembly onto each of the Zone 1 lamps in both ovens, to focus and limit the view angle of the energy to a narrower area on the preform 220.

The crystallization process was run at an effective rate of 700 preforms 220 per cavity per hour on the Sidel SBO1/2 machine. This production rate resulted in a residence time of 53 seconds in the dual oven section. The fan speed was set to 80% of maximum gain for both the oven and neck cooling circuits. The two Zone 1 lamps were each operated at 100% of rated power outputs of 3000 watts.

After heating, the preforms 220 were removed from the spindles using the conventional transfer tooling, and transferred through a disabled blowing station to an outfeed rail. The preforms 220 were further cooled for 45 seconds at ambient on the outfeed rail prior to bulk packing.

The preforms 220, having the thermal crystallization treatment, were converted into outer containers 22 using a Sidel SBO1/2 injection stretch blow molding machine. The outer containers 22 were produced by the conventional process known to those skilled in the art. The outer containers 22 were manufactured at a rate of 1000 outer containers 22 per cavity per hour. The lower neck portion 24L of these outer containers 22 had a thickness of 5 mm and were crystallized therethrough with 21-22 percent thermal crystallinity.

Differential Scanning Calorimetry (DSC) may be used to quantify the percentage of crystallinity at or through the thickness of the wall, at specific locations on the injection stretch blow molded (ISBM) outer container 22 and/or preform 220. These crystallinity measurements may be made using a DSC instrument such as the TA Instruments DSC model Q2000 V24.10, with nitrogen purge capability, using Universal Version 4.7A software (TA Instruments, Wilmington, Del.) or equivalent.

Referring to FIGS. 6A, 6B and 6C, the crystallinity measurements are made on samples 4N, 14I, 12I, 34I cut from the outer container 22/preform 220 at each of five specific locations. The full wall thickness of the plastic is to be sampled and measured at each location cited below.

The five specific locations on the outer container 22/preform 220 to be sampled are:
1. One Upper Neck Region 24U
2. One Lower Neck Crystallized Region 24L as discussed above relative to the crystallized region CR (samples 1.1, 1.2, 1.3 . . . 1.X), defined as starting immediately below the flange 24F or immediately below the neck 24 midpoint MP (in the absence of a flange) and extending for at least 10 mm into the neck/shoulder transition location as discussed above relative to the crystallized region CR (samples 1.1, 1.2, 1.3 . . . 1.X), defined as starting immediately below the flange 24F or below the neck 24 midpoint MP and extending toward the bottom of the outer container 22 if a flange 24F is not present.

3-5. Three sample locations 14I, 12I and 34I taken from the wall 29, particularly from the regions of the outer container 22 at ¼, ½, and ¾ increments, 14I, 12I and 34I, respectively along the longitudinal axis LA, as taken from the bottom of the base to the top of the outer container 22. If the container 22 has a nonround cross section, the sample 14I, 12I and 34I are taken from the portion of the wall 29 radially furthest from the longitudinal axis LA.

The samples 4N may be cut from the neck 24 using a fine toothed hacksaw blade or equivalent. The outer container 22 may be held in a vice during cutting. The sample 4N may be finally cut using a box cutter, using a new blade for each outer container 22. The samples 4N, 14I, 12I and 34I may be placed on a cutting block to trim away excess material.

Figure 7:
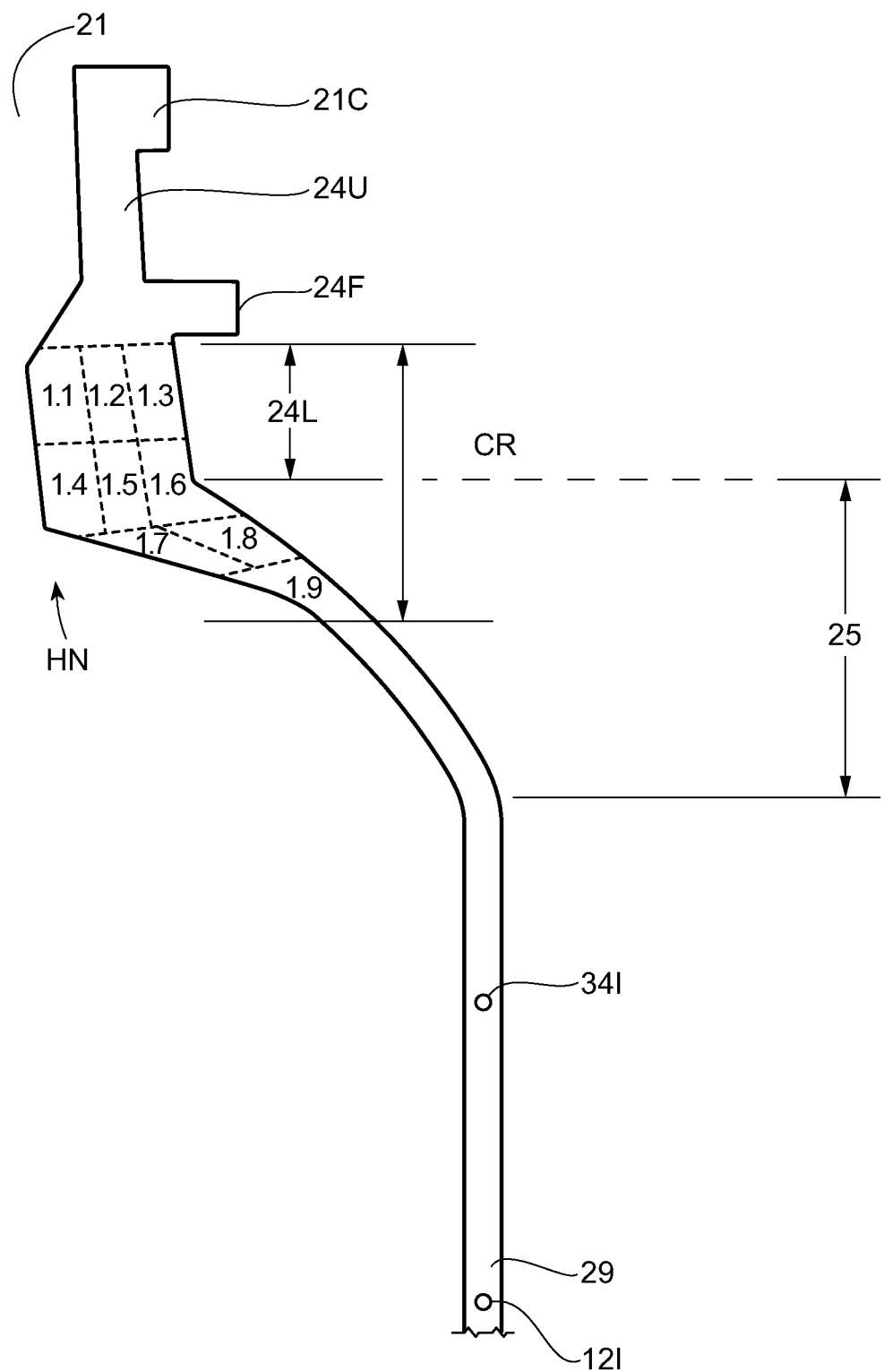
FIG. 7 is a schematic, fragmentary vertical sectional view of an outer container, showing the sampling locations.

Referring to FIG. 7, samples 1.1-1.9 are taken through the wall thickness from each location to be analyzed. Each sample 1.1-1.9 may be appropriately sized to fit into the DSC sample pans and may be no larger than 3 mm in size in any dimension, in order to properly fit into the DSC sample pans. Material that is part of an internal valve mechanism or otherwise not part of the wall of the outer container 22 or preform 220 is excluded from consideration.

Individual sections of the sample 1.1-1.9 may be outlined using a fine tip marker pen at the specified locations, such that each section has a dimension no larger than 3 mm, and a width of no less than 1 mm, unless the outer container 22 is less than 1 mm thick. This step will create an appropriate sample size for the analysis (minimum 0.003 g). In outer containers 22 having a thickness of the greater than 3 mm, more than one sample 1.1-1.9 will be required at a specific location in order to obtain the DSC values, and thus a weight-averaged percentage crystallinity through the full wall thickness of the plastic. Samples 14I, 12I and 34I may be obtained from the sidewall 29 using a punch having a 3 mm diameter.

The mass of each sample 1.1-1.9 is recorded to the nearest 0.0001 g. Each sample 1.1-1.9 is placed into an individual aluminum DSC pan, as per the manufacturer's instructions. The empty reference pan and loaded sample pans are placed into the respective slots in the instrument autosampler.

The DSC is programmed to ramp up the temperature in Standard Mode at a rate of 10° C./min from 30° C. up to 300° C., with an approximately 20° C. nitrogen gas purge. The sample 1.1-1.9 identifications and respective masses are entered, then run sequence initiated. Data are collected throughout the heating run. The sample 1.1-1.9 is heated in the DSC only once, and is only measured during its first known post-manufacture heating event.

Figure 8:
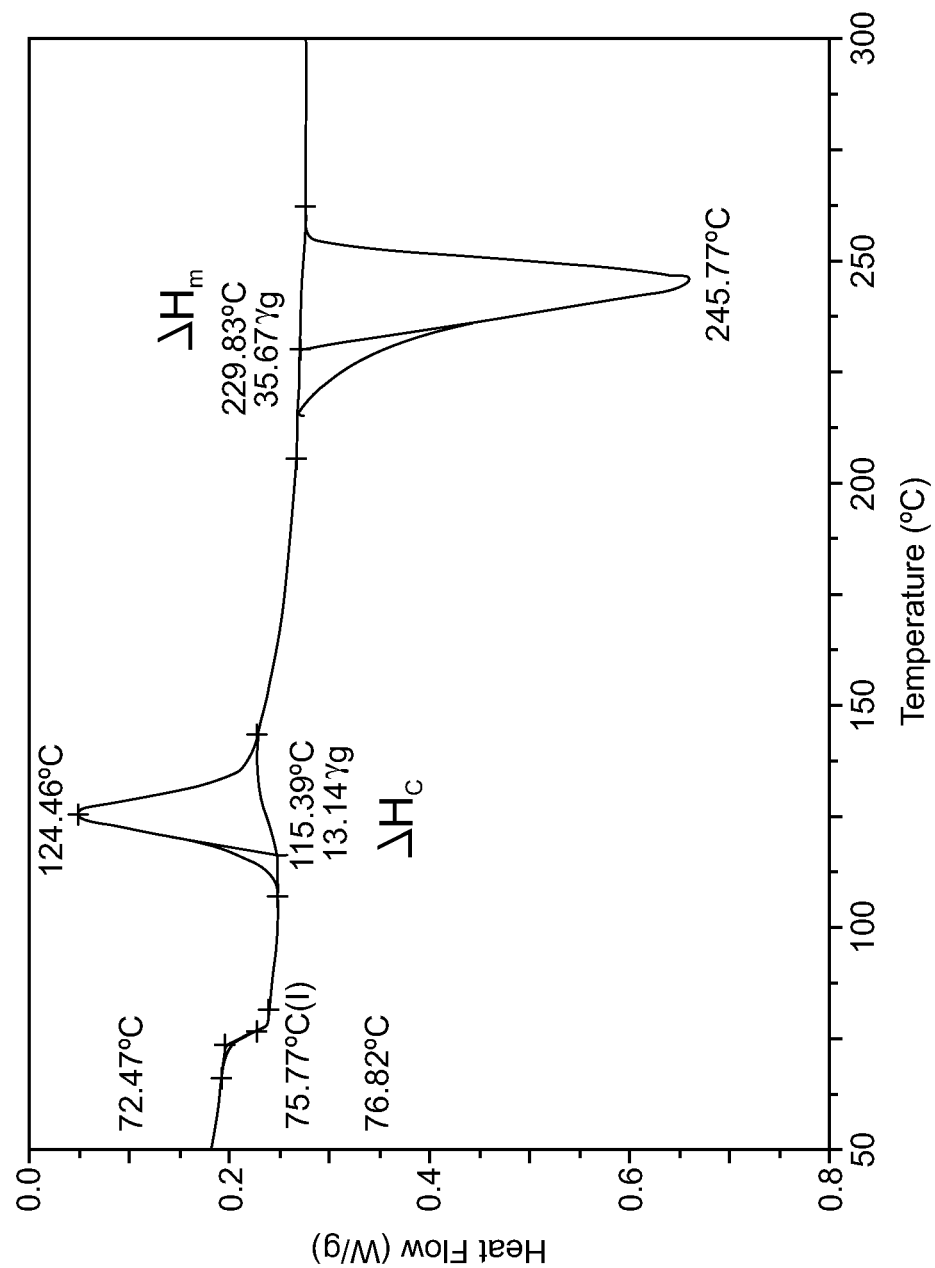
FIG. 8 is a graphical representation of the heat flow during a sample test using a differential scanning calorimeter.

Referring to FIG. 8, for each sample 1.1-1.9, the exothermic heat of cold crystallization ($\Delta H_c$ [J/g]) and the heat of melting ($\Delta H_m$ [J/g]) are determined using the DSC analysis software. The heats of cold crystallization (exotherm, 90-180° C.) and of melting (endotherm, 190-280° C.) may be determined by using the instrument software to integrate the areas (J/g) under the relevant peaks.

A reference value ($\Delta H_m°$ [J/g]) may be used to represent the theoretical heat of melting if the polymer were 100% crystalline. This reference heat of melting has been established for common polymers and such values are available in the published literature, in DSC instrument software, or from DSC instrument manufacturers such as PerkinElmer.

When the outer container 22 under consideration is predominantly made of PET, the average percent crystallinity in each sample is calculated using the theoretical reference heat of melting for 100% crystalline PET ($\Delta H_m°$) of: 140.1 J/g. The reference value for 100% crystalline heat of melting ($\Delta H_m°$ [J/g]) is selected, as is most appropriate for the particular plastic composition being tested, as would be known by one of ordinary skill.

The average percent crystallinity in each sample is calculated using the following equations: A raw result (X) that is less than 5.0 is calculated and reported as a percent crystallinity of 5.0%, namely:

$$X = [(\Delta H_m - \Delta H_c)/(\Delta H_m°) \times 100]$$

If X<5.0, then percent crystallinity=5.0%, or else percent crystallinity=X %

If X>40.0, then percent crystallinity=40.0%, or else percent crystallinity=X %

Example 2

With continuing reference to FIG. 7, For the PET sample shown, X=(30.9−9.8)/140.1×100=15.1, which is not less than 5.0 or greater than 40.0, so percent crystallinity=15.1%. By contrast, in a different specific PET sample, X=(35.7−32.0)/140.1×100=2.6, which is less than 5.0, so percent crystallinity=5.0%, or X=(60.0−0.0)/140.1×100=42.8%, which is greater than 40.0% so percent crystallinity=40.0%.

For each sample under consideration, the weight-average percent crystallinity is calculated. Each sample may be subdivided into multiple pieces for testing. Table 1 below shows the sample was subdivided into nine pieces for testing.

$$\text{The weight average \% crystallinity value} = \sum_{i=1}^{n} \frac{w_i}{\sum_{i=1}^{n} w_i} x_i$$

where: $W_i$=sample mass, $X_i$=% sample crystallinity, n=number of samples

TABLE 1

| Location | % Crystallinity | Mass (mg) | Mass Fraction | Weighted Crystallinity |
|---|---|---|---|---|
| Upper Neck Sample 1 | 6.8 | 12.3 | | |
| CR Sample 1.1 | 10.7 | 9.1 | 0.11 | 1.16 |
| CR Sample 1.2 | 15.1 | 8.4 | 0.10 | 1.52 |
| CR Sample 1.3 | 15.1 | 10.1 | 0.12 | 1.82 |
| CR Sample 1.4 | 22.5 | 11.1 | 0.13 | 2.99 |
| CR Sample 1.5 | 20.9 | 7.0 | 0.08 | 1.75 |
| CR Sample 1.6 | 19.0 | 9.2 | 0.11 | 2.09 |
| CR Sample 1.7 | 23.9 | 9.0 | 0.11 | 2.57 |
| CR Sample 1.8 | 14.9 | 9.4 | 0.11 | 1.68 |
| CR Sample 1.9 | 29.0 | 10.2 | 0.12 | 3.57 |
| | Total Mass | 83.5 | Weighted average crystallinity | 19.2% |
| Sidewall Top | 29.2 | 4.9 | | |
| Sidewall Middle | 28.3 | 5.1 | | |
| Sidewall Bottom | 27.9 | 5.2 | | |

The ratio of percent crystallinity is to be calculated for each outer container 22 tested. The ratio of the percent crystallinity of the neck 24/shoulder 25 sample, is divided by the maximum percent crystallinity of the sidewall 29 samples.

If the weight average crystallinity of the neck 24/shoulder 25 sample is 19.2% and the maximum crystallinity value of the wall 29 sample is 29.5%, then $$R=19.2/29.2=0.66 \text{ or } 66\%$$

For each type of outer container 22 or preform 220 under consideration, three replicate outer containers 22/performs 220 are analyzed, if possible. The average of the three outer containers 22/preforms 220 is the value to be considered for purposes set forth below.

Additional information on DSC crystallinity measurements may be obtained from the PerkinElmer DSC application note: PETech-40 Thermal Analysis "DSC as Problem Solving Tool: Measurement of Percent Crystallinity of Thermoplastics" by W. J. Sichina, copyright 2000, published by PerkinElmer Instruments Inc, Waltham, Mass.

Relative spatial references herein, such as above, below, up, down, radial, etc. are taken in the in-use position with the longitudinal axis LA generally vertically oriented and perpendicular to a horizontal reference surface. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aerosol dispenser having a longitudinal axis and comprising:
    an outer container, said outer container having a neck having an opening at one end thereof, said neck having an upper neck portion proximate said opening and a lower neck portion juxtaposed with said upper neck portion;
    a shoulder juxtaposed with said neck, and extending radially outward therefrom;
    a body having a sidewall juxtaposed with said shoulder;
    a base joined to said sidewall;
    said lower neck portion comprising a crystallized region, said crystallized region having a crystallization from 10 to 40 percent, wherein said lower neck portion has a wall thickness, said crystallized region being crystallized substantially throughout said wall thickness of said lower neck portion and wherein both of said upper neck portion and said lower neck portion have a respective crystallinity, the ratio of said crystallinity of said upper neck portion to the crystallinity of said lower neck portion being at least about 2.5:1; and
    a valve assembly for selectively dispensing contents of said aerosol dispenser.

2. An aerosol dispenser according to claim 1 wherein said crystallinity of said crystallized region is from about 12 to about 18%.

3. An aerosol dispenser according to claim 1 wherein said crystallized region has an axial dimension from about 2 to about 5 mm.

4. An aerosol dispenser having a longitudinal axis and comprising:
    an outer container, said outer container comprising an opening at one end thereof;
    a neck subjacent said opening and having an upper neck portion and a lower neck portion, said upper neck portion having an upper neck crystallization and said lower neck portion having a lower neck crystallization, said upper neck crystallization being at least 10 percent less than said lower neck crystallization and wherein said lower neck portion crystallinity is from about 15 to about 25 percent;
    a shoulder juxtaposed with said neck, and extending radially outward therefrom;
    a sidewall juxtaposed with said shoulder;
    a base joined to said sidewall;
    a neck crystallized region, said crystallized region being disposed on said lower neck portion, wherein said neck crystallized region has a neck crystallized percentage, and said sidewall has a sidewall crystallized percentage, said neck crystallized percentage being in a range of from about 0.4 to about 1.6 times said sidewall crystallized percentage;
    and said aerosol dispenser comprising a valve assembly for selectively dispensing contents of said aerosol dispenser.

5. A aerosol dispenser according to claim 4 wherein range is from about 1.1 to about 1.3.

6. An aerosol dispenser according to claim 5 wherein range is from about 0.6 to about 0.8.

7. An aerosol dispenser according to claim 4 further comprising a flange circumscribing said neck and dividing said neck into an upper neck portion and a lower neck portion.

8. An aerosol dispenser according to claim 4 wherein said lower neck portion has a wall thickness, said crystallized region being crystallized substantially throughout said wall thickness of said lower neck portion.

9. An aerosol dispenser according to claim 8 wherein said crystallized region has a wall with an inner surface portion having an inner surface crystallinity and an outer surface portion opposed thereto having an outer surface crystallinity, and a mid-wall therebetween having a mid-wall crystallinity, said inner surface crystallinity and said outer surface crystallinity being greater than said mid-wall crystallinity.

10. An aerosol dispenser having a longitudinal axis and comprising:
    an outer container, said outer container having a neck having an opening at one end thereof, said neck having an upper neck portion proximate said opening and a lower neck portion juxtaposed with said upper neck portion;
    a shoulder juxtaposed with said neck, and extending radially outward therefrom;
    a body having a sidewall juxtaposed with said shoulder;
    a base joined to said sidewall;

said lower neck portion comprising a crystallized region, said crystallized region having a crystallization from 12 to 18 percent, wherein both of said upper neck portion and said lower neck portion have a respective crystallinity, the ratio of said crystallinity of said upper neck portion to the crystallinity of said lower neck portion being at least about 2.5:1; and a valve assembly for selectively dispensing contents of said aerosol dispenser.

* * * * *